July 1, 1958
C. E. DREW
2,841,402
EXPANDING MANDREL CHUCK
Filed Nov. 7, 1955
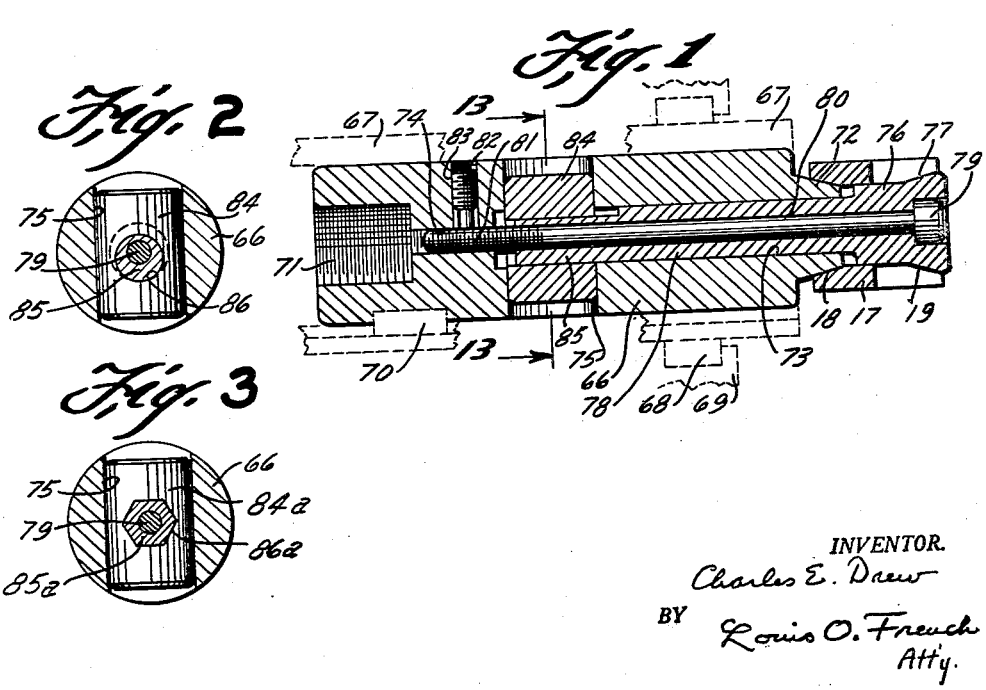
INVENTOR.
Charles E. Drew
BY Louis O. French
Atty.

2,841,402
EXPANDING MANDREL CHUCK

Charles E. Drew, Racine, Wis.

Application November 7, 1955, Serial No. 545,156

4 Claims. (Cl. 279—2)

The invention relates to expanding type mandrel chucks.

In some forms of chucks of the type mentioned a so-called drawpin is used to expand the mandrel, and sometimes there is a tendency of the cutter, acting on the work, to rotate the mandrel and through it rotate said drawpin, which is highly objectionable as such rotation may throw out the mandrel adjustment and also cause wear on the pin whose dimensions must be held within close tolerances to insure accuracy of centering the mandrel and hence the work thereon. The main object of the invention is to provide a simple and effective means which while permitting axial movement of the mandrel expander drawpin will firmly lock the drawpin against turning under sudden heavy loads imparted to it through the mandrel and thus prevent the mandrel itself from slipping or turning, and in this connection the present application shows an alternative form from that of my copending application Serial No. 460,696, filed October 6, 1954, now Patent No. 2,789,825, for Expanding Mandrel Chuck.

In the drawings:

Fig. 1 is a detailed vertical sectional view of a mandrel chuck embodying the invention;

Fig. 2 is a detailed vertical sectional view taken on the line 13—13 of Fig. 1;

Fig. 3 is a view similar to Fig. 2 showing certain modifications.

Figs. 1 to 3 show a modification in which the chuck body 66 is a cylindrical member adapted to be mounted in the rotatable hollow spindle 67, journalled in bearings 68 in the headstock 69, of a lathe or other suitable machine tool, to which spindle it is slidably keyed at 70, similar to the usual collet, and has a threaded bore 71 at its rear end for engagement with a drawbar (not shown). The front end 72 of the chuck 66 is conically shaped to fit the tapered end 18 of the mandrel 17. The chuck has axially alined differential bores 73 and 74 extending centrally thereof and a transverse bore 75 with its vertical axis intersecting the center of said bore adjacent the rear end thereof.

A drawpin 76 has a conical head portion 77 to engage the tapered end 19 of the mandrel 17 and a cylindrical shank 78 to closely slidably fit the bore 73. The drawpin 76 is moved inwardly to engage the mandrel and expand the same to a work holding position by cooperative engagement of the head 77 and end 72 by a clamping bolt or screw 79 that extends through a centrally disposed bore 80 in the pin and has a threaded shank portion 81 engaging threads of the bore 74. The mounting of the work on the mandrel is done while the chuck is either in a forwardly extended position or is outside the spindle 67 so that access can be had to a locking screw 82 mounted in a radially disposed bore 83 in the chuck and engageable with the threaded shank portion 81 after the mandrel has been engaged with the work.

The torsion resisting means for the drawpin is, in this instance, provided by a non-rotative connection between a collar 84, in the form of a cylindrical block, slidably mounted in the bore 75. In Figs. 1 and 2, a portion 85 of the shank of the drawpin is formed as an eccentrically disposed pin which closely fits a round hole 86 in the block or collar 84. In Fig. 3, the block 84a, similar to the block 84, has a polygonal hole here shown as a hexagonal hole 86a that slidably interfits with a hexagonal pin portion 85a of the drawpin instead of the eccentric pin portion 85. No special locking screws for the collar or block 84 or 84a are necessary in this design to hold the block against turning relative to the chuck body and, while held against rotation relative to the drawpin, said pin is free to slide in the block during work assembly and disassembly operations.

It is to be noted that the drawpin 78 is free to slide in the block or collar 84 or 84a in its movement to work clamping or release positions.

While the chuck herein has been shown and described as mounted on a rotary member, it is to be noted that such chuck may also be used on non-rotating supports used in milling machines, table fixtures, bench fixtures, chucking fixtures, and the like.

I desire it to be understood that this invention is not to be limited to any particular form or arrangement of parts except in so far as such limitations are included in the appended claims.

What I claim as my invention is:

1. In a chuck, the combination of a chuck member having an apertured tapered spindle, a lengthwise adjustable drawpin having a tapered end and a shank having a portion slidably movable and guided in the aperture in said spindle, an expanding chucking mandrel engaged by said tapered spindle and the tapered end of said drawpin, and torsion resisting means permitting free lengthwise sliding movement of said shank relative to said chuck member but resisting its turning movement including a torsion resisting collar non-rotatably mounted on a portion of the shank of said drawpin rearwardly of said portion of the shank in said aperture and also mounted in a bore in said chuck member disposed at right angles to said aperture in said chuck member.

2. The chuck as defined in claim 1 wherein the torsion resisting collar is a cylindrical block and the right angled bore is a round bore receiving said block.

3. The chuck as defined in claim 1 wherein the non-rotative mounting of said collar and drawpin is formed by an eccentric portion of the shank of said drawpin fitting in a circular bore in said collar.

4. The chuck as defined in claim 1 wherein the non-rotative mounting of said collar and drawpin is formed by a polygonal portion of said shank fitting in a polygonal bore in said collar.

References Cited in the file of this patent

UNITED STATES PATENTS

| | | |
|---|---|---|
| 963,559 | Hines | July 5, 1910 |
| 1,401,281 | Rohs | Dec. 27, 1921 |
| 2,435,480 | Tuttle | Feb. 3, 1948 |
| 2,654,610 | De Vlieg | Oct. 6, 1953 |
| 2,679,399 | Van Dorn | May 25, 1954 |
| 2,739,818 | Benjamin et al. | Mar. 27, 1956 |
| 2,789,825 | Drew | Apr. 23, 1957 |